(12) United States Patent
Eschtruth et al.

(10) Patent No.: US 8,868,298 B2
(45) Date of Patent: Oct. 21, 2014

(54) ELECTRIC POWER ASSIST STEERING MOTOR SENSOR REDUNDANCY

(71) Applicant: Ford Global Technologies, LLC, Dearborn, MI (US)

(72) Inventors: Kirt L. Eschtruth, Livonia, MI (US); William J. Bouse, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/784,446

(22) Filed: Mar. 4, 2013

(65) Prior Publication Data

US 2014/0249724 A1    Sep. 4, 2014

(51) Int. Cl.
*G05B 5/01* (2006.01)
*G05D 1/00* (2006.01)
*B62D 5/04* (2006.01)

(52) U.S. Cl.
CPC .................... *B62D 5/0484* (2013.01)
USPC ............................................ 701/43; 318/611

(58) Field of Classification Search
USPC ........................................... 701/43; 318/611
See application file for complete search history.

(56) References Cited

U.S. PATENT DOCUMENTS

| | | | |
|---|---|---|---|
| 4,865,144 A | | 9/1989 | North |
| 4,939,654 A | * | 7/1990 | Kouda et al. ................. 701/39 |
| 5,554,969 A | * | 9/1996 | Eguchi ......................... 340/438 |
| 6,755,276 B2 | * | 6/2004 | Clephas ........................ 180/402 |
| 7,382,295 B2 | * | 6/2008 | Otsuka et al. ................. 341/116 |
| 7,392,879 B2 | | 7/2008 | Imagawa et al. |
| 8,080,957 B2 | * | 12/2011 | Miura et al. ............. 318/400.23 |
| 2003/0062868 A1 | * | 4/2003 | Mir et al. ..................... 318/599 |
| 2006/0176005 A1 | * | 8/2006 | Ta et al. ........................ 318/650 |
| 2008/0067960 A1 | * | 3/2008 | Maeda et al. ............. 318/400.02 |
| 2008/0211446 A1 | * | 9/2008 | Kobayashi .................... 318/611 |
| 2009/0240389 A1 | * | 9/2009 | Nomura et al. ................. 701/29 |
| 2010/0017063 A1 | * | 1/2010 | Maeda ........................... 701/42 |
| 2012/0145472 A1 | * | 6/2012 | Imamura et al. ............. 180/446 |
| 2013/0293171 A1 | * | 11/2013 | McLean et al. .......... 318/400.32 |

FOREIGN PATENT DOCUMENTS

| | | |
|---|---|---|
| JP | 2003026020 A | 1/2003 |
| JP | 2010162954 A | 7/2010 |

OTHER PUBLICATIONS

Murugan et al., DSP-based electric power assisted steering using BLDC motor, Sādhanā, Oct. 2008, pp. 581-590, India [10 pages].
Shao, Jianwen, Direct Back EMF Detection Method for Sensorless Brushless DC (BLDC) Motor Drives, Thesis, Sep. 2003, Blacksburg, VA [91 pages].

* cited by examiner

*Primary Examiner* — Thomas G Black
*Assistant Examiner* — Tyler Paige
(74) *Attorney, Agent, or Firm* — Raymond L. Coppiellie; Bejin Bieneman PLC

(57) ABSTRACT

An electric power assist steering motor sensor redundancy system is disclosed comprising a brushless motor selectively providing a first predetermined level of steering assistance for a vehicle. A first sensor and second sensor provide position information of the brushless motor to a motor controller. An alternative sensing system for the brushless motor may be selectively utilized to provide position information of the brushless motor to the controller when at least one of the first sensor or the second sensor fails.

20 Claims, 4 Drawing Sheets

ELECTRIC POWER ASSIST STEERING MOTOR SENSOR REDUNDANCY

BACKGROUND

A vehicle's power assisted steering is a feature that is expected by many consumers and is provided in almost every passenger vehicle. Consumers have become accustomed to the failure modes of traditional Hydraulic Power Assist Steering (HPAS) insofar that typical failure modes are noticeable by the driver. HPAS failure modes typically comprise noise, leaks, and reduced and/or loss of power steering assist. Typically, a loss of power steering assist will be predicated by a leak or noise or both.

More recently, traditional HPAS systems are being replaced with Electric Power Assist Steering (EPAS) as the market demands advantages only a microprocessor controlled steering system can provide. EPAS systems show advances in features and quality. An EPAS system can monitor the state of the system many times per second (e.g., hundreds or thousands of times a second). Upon a detection of a problem, the system can act and bring the steering system to a safe state.

Shortcomings of existing systems include that the safe state is commonly a removal of the power steering assist feature itself, and typically without any other symptoms prior to the removal. This can be quite annoying and startling to the driver. Moreover, when analyzing the failure rates of the power assisted steering systems it is common to see a drastic increase of loss of assist failures when a vehicle platform migrates from a hydraulic to electric power.

DETAILED DESCRIPTION

A central sub-system typically found in EPAS systems is the motor position sensor. The system may include independent motor position sensing elements that are compared to one another to insure safe operation. The failure rate of either of the elements and their associated circuitry of the sub-system are a key contributor to failure rates of all EPAS systems today. As described herein, when EPAS motor position sensing fails, an alternative sensing system may be used to address safety and reliability of the EPAS system. This improved system provides a less obtrusive steering methodology after sensor failure and provides a less startling feel to the driver rather than removing the steering assist all together.

Figure 1:
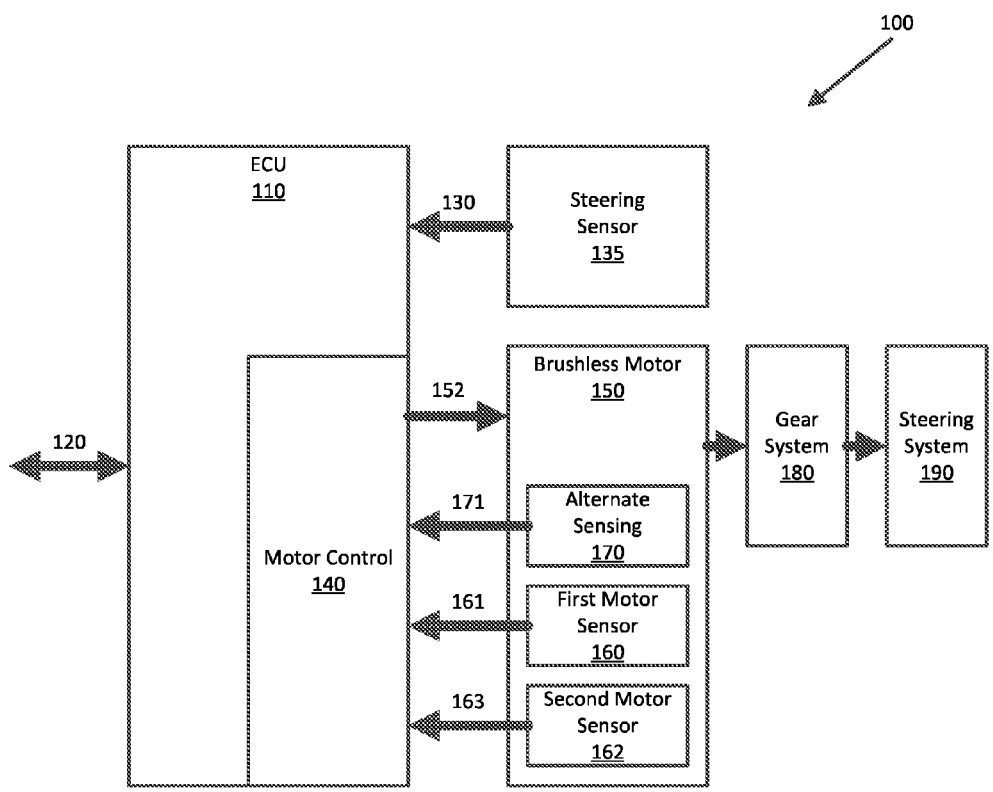
FIG. 1 is a block diagram of an electric power assist steering system.

FIG. 1 is a block diagram of an electric power assist steering system 100. An electronic control unit (ECU) 110 may be utilized to control the electric power assist steering system 100. The ECU 110 may communicate with the vehicle network via interface 120. The vehicle network typically comprises controller area network (CAN) protocols, but may utilize any network philosophy to communicate with other ECUs in the vehicle system. ECU 110 also includes a vehicle steering sensor interface 130 that is configured to detect steering position and/or forces applied by the driver via a steering sensor 135. Typical EPAS steering sensors 135 may include steering torque or position sensing and may be affixed to the steering column.

ECU 110 may also include motor control 140 that includes drive logic as well as sensing circuitry and logic. Motor control 140 may be configured as an integrated component or it may be configured as a distributed system with components for motor drive and sensing placed strategically in the EPAS system. As shown herein, motor control 140 is shown as a block for simplicity. However, the functions, processor(s), and circuitry need not be integrated together.

A brushless motor 150 may be controlled by motor control signals 152 to position and control the motion of the brushless motor 150. As described herein, brushless motor 150 is shown as a three-pole brushless DC motor. However, brushless motor 150 may be configured as a multi-pole motor with greater than three coils. To sense and/or detect the position of brushless motor 150 for proper driving via motor control signals 152, a first motor sensor 160 may be used to detect the position of brushless motor 150. While a single position sensor may be used, it may be preferable to utilize a second motor sensor 162 to verify the position of brushless motor 150 during operation. First motor sensor 160 and second motor sensor 162 may then be used to check the position of brushless motor 150 in case a sensor failure would result in improper drive a brushless motor 150.

A first motor sensor signal 161 and a second motor sensor signal 163 may be sent to motor control 140 respectively by first motor sensor 160 and second motor sensor 162. These signals may be received by motor control 140, and ECU 110, to determine the proper motor control signals 152. Motor control 140 and/or ECU 110 may also compare first motor sensor signal 161 and second motor sensor 163 to determine whether or not either of the sensors has failed.

If either of first motor sensor 160 or second motor sensor 162 has been determined as invalid (e.g., failed), then an alternative sensing system 170 may provide an alternative position signal 171 two motor control 140 and/or ECU 110. As described herein, alternative sensing system 170 may include back-EMF detection (e.g., phase current detection methodology) of at least one coil of brushless motor 150 to provide an alternative position signal 171 when one of first motor sensor 160 or second motor sensor 162 has failed.

As discussed herein, first motor sensor 160, second motor sensor 162, and/or alternative sensing system 170 may be integrated with brushless motor 150 or may be separate assemblies. Moreover, circuitry for detection of first motor sensor 160, second motor sensor 162, and/or alternative sensing system 170 may be partially located with brushless motor 150, motor control 140, and/or ECU 110, or may be substantially integrated with brushless motor 150, motor control 140 and/or ECU 110.

Motor control 140 may comprise circuitry, including, but not limited to, high and low side drivers (e.g., MOSFETS) for each coil of brushless motor 150. The driving circuitry may selectively present predetermined voltages on each coil, or may present high impedance to the coils. Moreover, portions of the drive circuitry may be integrated with brushless motor 150, ECU 110, or may be included in a subassembly therebetween.

Brushless motor 150 may be engaged with a gear system 180 that controls the mechanics of the steering system 190. The specifics of gear system 180 and or steering system 190 are not described herein. However, it is understood that one of skill in the art may use the EPAS system as described herein to control various types of steering arrangements.

Figures 2, 3:
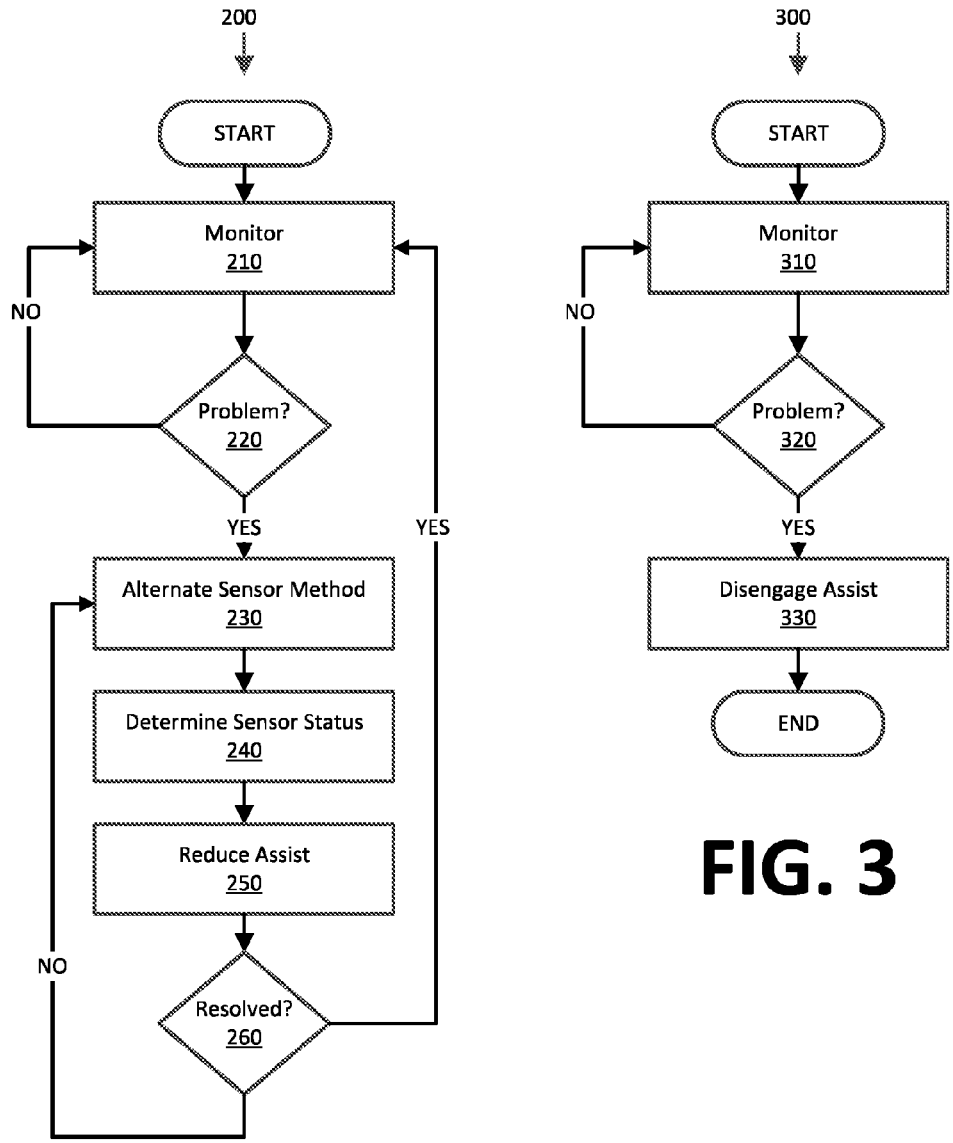
FIG. 2 illustrates an exemplary process for providing redundancy in the electric power assist steering system.
FIG. 3 illustrates an exemplary process for disengaging the electric power assist steering system.

FIG. 2 illustrates an exemplary process for providing redundancy in the electric power assist steering system 200. The process starts and monitoring begins at step 210. Monitoring may include receiving signals 161, 163 from first motor sensor 160 and second motor sensor 162, respectively. The positions provided to motor control 140 and/or ECU 110 may be compared for correctness. First motor sensor signal 161 and a second motor sensor signal 163 may include absolute position information or may be provided as a pulse corresponding to a particular and predetermined angular position of brushless motor 150. In normal operation, a first predetermined level of steering assist is provided and may be generally adjusted using factors such as speed and steering angle.

Depending on the signal types provided for position, the system may use different approaches to determine the validity of the position information provided and or determine whether one or more sensors have failed. In an example, where absolute position information is provided by first motor sensor 160 and/or second motor sensor 162, the position provided by each sensor signal 161, 163 may be compared and a predetermined tolerance applied to the signals. If the signals do not match within the predetermined tolerance, one or more of the sensors may be determined as failed. In another example, where sensor signals 161, 163 are provided as pulses, the pulse trains from each sensor signal 161, 163 may be conditioned and compared against each other given the driven speed of brushless motor 150. Knowing the angular position of first motor sensor 160, second motor sensor 162, and the driven speed of brushless motor 150, the expected timing of each sensor pulse 161, 163 may be compared given a predetermined tolerance to determine whether one or more of the sensors has failed. In general, the verification of sensor signals may occur many times per second.

In step 220, sensor signals 161, 163 are compared and a determination is made whether or not one or more of first motor sensor 160 and second motor sensor 162 has failed. The determination may take into account the speed that brushless motor 150 is driven at, and/or whether or not first motor sensor 160 or second motor sensor 162 have had prior events that may indicate sensor failure. If both of first motor sensor 160 and second motor sensor 162 are determined to be valid, then no problem is detected, and the process continues at step 210.

If a problem is detected with first motor sensor 160 and or second motor sensor 162, then a diagnostic condition may be flagged. Moreover, first motor sensor 160 and second motor sensor 162 may be deemed invalid, and that information may be stored for later use. Additionally, information about sensor failure may be transmitted via vehicle network using interface 120 allow for a vehicle level strategy and or driver warnings to be utilized. The process then continues at step 230 where an alternate sensing method may be selectively utilized.

At step 230, the system may begin to implement an alternate sensor method (e.g., the alternate sensing system is enabled). As discussed herein and alternate sensor method may include driving certain coils of brushless motor 150 and detecting the back-EMF or induced voltage on a non-driven coil to determine the position of brushless motor 150. The process then continues at step 240.

At step 240, the status of each sensor is determined utilizing the alternate sensing method 230 to validate at least one sensor 160, 162. The sensor status may be determined by comparing alternative position signal 171 with first motor sensor signal 161 and second motor sensor signal 163. The tolerances applied for the comparison may be determined by the methodology of first motor sensor 160 and second motor sensor 162.

As discussed herein steps 230, 240, 250 are shown as sequential steps. However, each of the steps may be reordered and/or partially or wholly integrated with each other. The process then continues at step 250.

At step 250, the predetermined level of steering assist may be reduced to a second predetermined level of steering assistance. The reduced steering assist may provide feedback to the driver that a steering problem has occurred. This may also be accompanied by a diagnostic message or indicator light to make the driver aware of a steering problem. This step is optional, and may also be determined by the amount of drive provided to brushless motor 150 when the alternate sensor method 230 is in use. For example, if brushless motor 150 is driven at a typical power of 100%, then a loss of driving force may necessarily reduce the level of steering assist when at least one coil is used for position detection. Alternatively, if in typical operation, brushless motor 150 is not driven at 100% power, then additional driving power may be used on the driven coils to make up for a loss of power when using at least one coil for position detection. The process then continues to step 260.

At step 260, the system may attempt to determine if the sensor problem has been resolved. This may be accomplished, for example, by checking sensor signals 161, 163 with the traditional monitoring approach as described in step 210. If sensor signals 161, 163 are determined to be valid, the system may deem the problem is resolved and control may proceed to step 210, essentially leaving the alternate sensor method and returning to normal operation. However, typical systems may require that sensor signals 161, 163 are valid for a certain period of time, introducing hysteresis such that the system is not oscillate between normal operation and the alternate sensor method.

However, given the safety critical nature of the steering system, when any sensor has failed the system may store a diagnostic code that may require service before normal operation of the EPAS system is restored.

In any of steps to 230, 240, 250 and/or 260 additional monitoring of the valid sensor and the alternate sensor method may be used and is described with respect to FIG. 3. Moreover, in any of steps to 230, 240, 250 and/or 260, the system may maintain the motor in a state of motion. Given the back-EMF detection method of alternate sensor method 230, motion may be required for alternative sensor method 230 to provide position information to ECU 110 and/or motor control 140. In general, the motor may be kept in a state of continuous dither to provide substantially continuous motion. Alternatively, ECU 110 and/or motor control 140 may continuously drive the motor to predetermined positions near a target position to keep the motor in motion. Additional information is provided with respect to FIG. 6.

If the sensor problem has not been resolved, the process then continues at step 230.

FIG. 3 illustrates an exemplary process for disengaging the electric power assist steering system 300. In general, the EPAS system may be disengaged if no valid position sensor information is available. This may include the loss (or invalidation) of two of first motor sensor 160, second motor sensor 162, and alternate sensor method 230.

The process starts at step 310, where the sensors are monitored. An invalid sensor determined by the process described in FIG. 2 may or may not be used to determine whether or not to disengage the EPAS system all together. Typically, the sensors determined to be valid are continuously monitored for yet another sensor failure. The process then continues at step 320.

If a problem is not detected with any of the valid sensors, the process continues at step 310. If a problem is detected with any of the valid sensors, the system may go into a failsafe mode and the process then continues at step 330.

At step 330, steering assistance may be disengaged. This may be based on safety requirements where at least two motor position sensors must be in agreement as to the motor position. However, it is possible to operate the system with a single position sensor providing feedback to motor control 140 and/or ECU 110. Thus, the process as described herein for disengaging the electric power assist during system may be configured based on safety requirements, design strategies, and/or may be overridden based on need.

Following the block 330, the process 300 ends.

Figure 4:
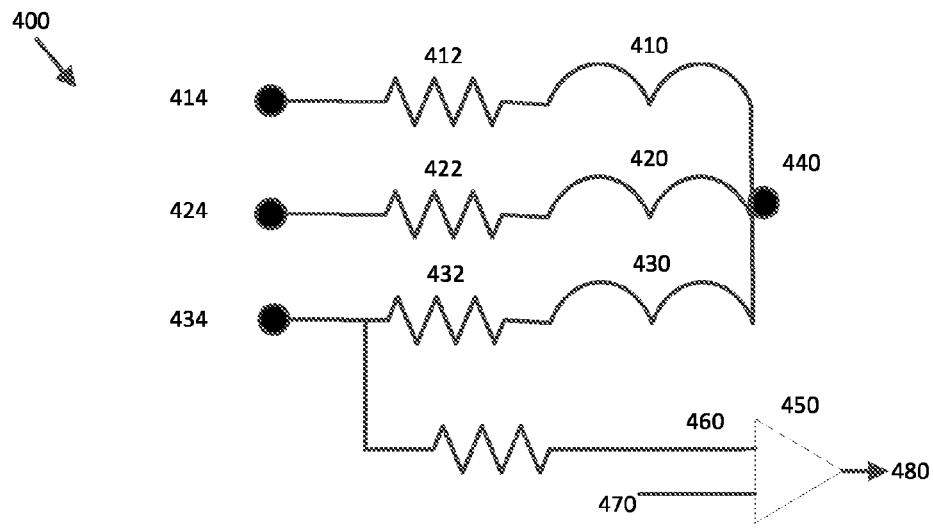
FIG. 4 illustrates an alternative sensing logic with a motor driving system.

FIG. 4 illustrates an alternative sensing logic with a motor driving system 400. Coils 410, 420, 430 are representative of the coils for brushless motor 150. As described herein, brushless motor 150 may be a three-pole motor or may have more than three coils. The description of the three-coil motor herein should not be construed as a constraint to utilizing the EPAS system. Each coil 410, 420, 430 may include an inherent resistance 412, 422, 432 as a result of the wire used to construct brushless motor 150. Driving signals and sensing may be accomplished via terminals 414, 424, 434 corresponding to each coil 410, 420, and 430, respectively. A common node 440 may connect one and of each coil 410, 420, 430.

As shown, a first coil 410 and a second coil 420 may be driven via terminals 414, 424. When the alternative sensing method 170 is employed, the third coil 430 may be used to detect back-EMF and therefore determine the position of brushless motor 150.

A comparator 450 may be used to detect the back-EMF signal 460 of coil 430. Comparator 450 uses back-EMF signal 460 and a bias voltage 470 to make a determination 480 that the magnet in brushless motor 150 is at a predetermined position. The determination signal 480 may then be conditioned and sent to motor control 140 as alternative position signal 171 (see FIG. 1). The system may be configured to detect an edge as the magnet and brushless motor 150 reaches a predetermined position, or it may be configured to detect the back-EMF maximum as the magnet sweeps through a predetermined position. As discussed herein, the back-EMF may be detected by a comparator 450, or alternative methods and circuitry may be employed to detect the position.

As shown, first coil 410 and second coil 420 are driven. Third coil 430 is used for back-EMF detection. As one of skill in the art will appreciate, while the brushless motor 150 is maintained in motion, two of coils 410, 420 and 430 may be driven and the non-driven coil may be used for back-EMF detection. While only a single comparator 450 is shown herein, each of coils 410, 420, 430 may have comparators to determine the position. This allows use of alternate sensing system 170 while the motor is rotated through 360°.

Figure 5:
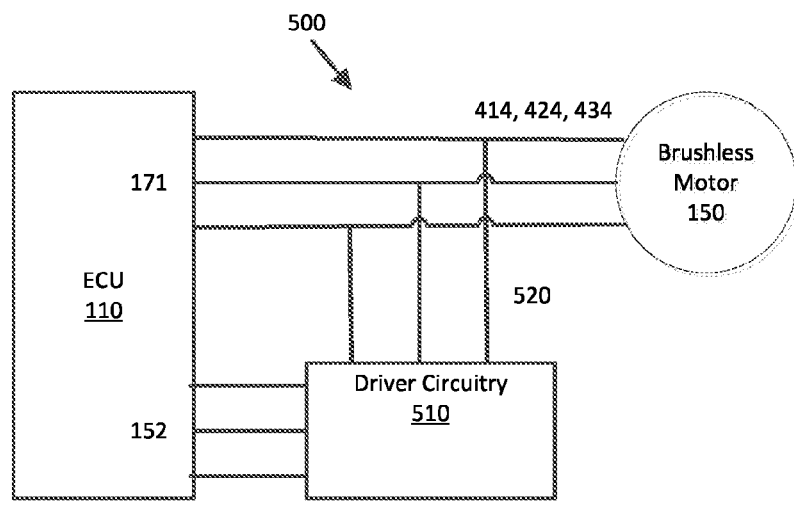
FIG. 5 illustrates a motor driving and an alternative sensing logic.

FIG. 5 illustrates a motor driving and an alternative sensing logic 500. ECU 110 (see also FIG. 1) outputs motor control signals 152 to driver circuitry 510. Driver circuitry 510 may include high and low side drivers to control brushless motor 150. Driver circuitry 510 may also include system protection and may be configured to not interfere with back-EMF detection. Driver circuitry 510 may output control signals 520 that connect with motor terminals 414, 424, 434.

Motor terminals 414, 424, 434 may be presented to ECU 110 as alternative position signals 171. Although alternative position signals 171 are shown as directly connected to ECU 110, the signals may be conditioned between brushless motor 150 and ECU 110. Moreover, the comparators 450, or other circuitry, may be used externally to ECU 110 or may in be integrated with ECU 110. Although not shown specifically herein, one of skill in the art will appreciate that the signals may be conditioned prior to use by ECU 110.

Figure 6:
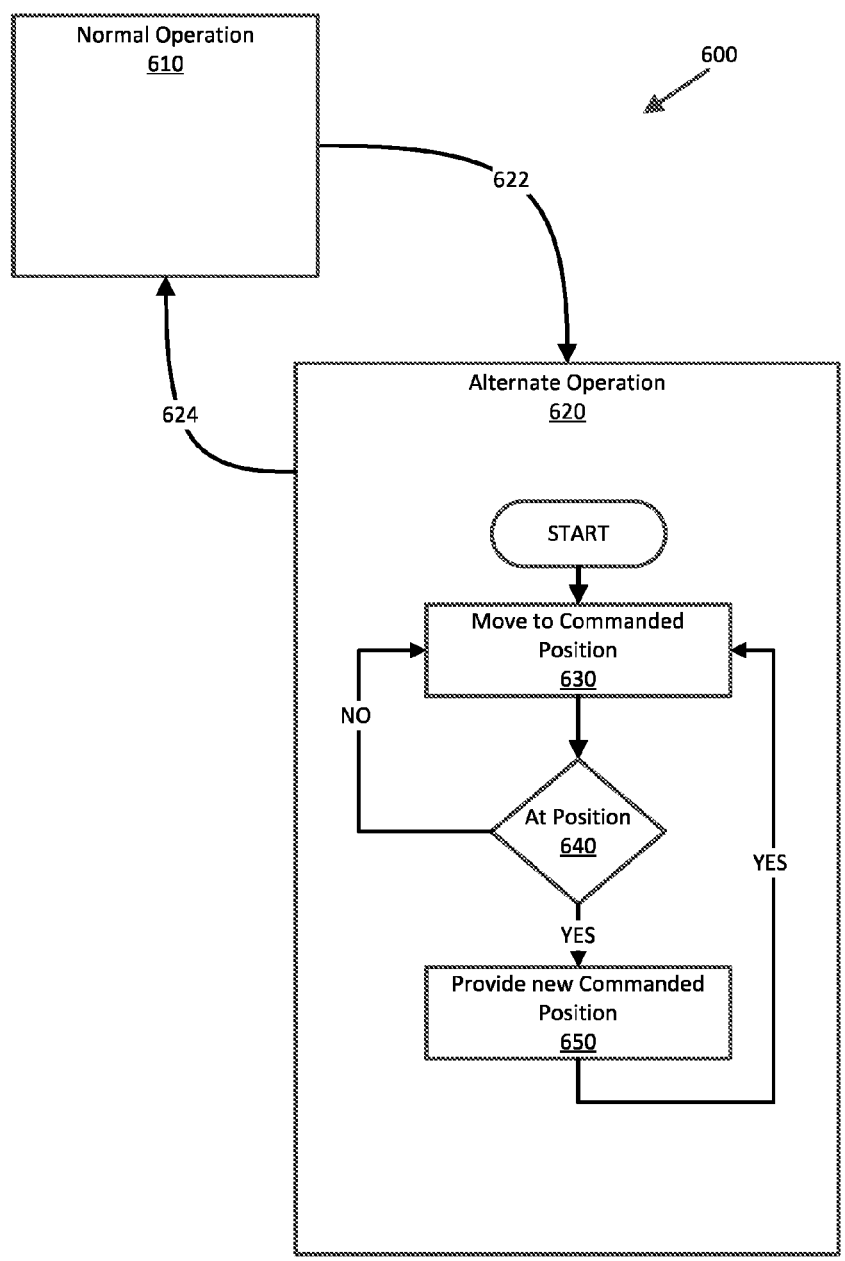
FIG. 6 illustrates an exemplary constant motion process for the electric power assist steering system.

FIG. 6 illustrates an exemplary constant motion process for the electric power assist steering system 600. In normal operation 610n the system may simply move brushless motor 152 to a particular commanded position. However, the EPAS system may transition 622 to alternate operation mode 620 or resume normal operation via transition 624.

While in alternate operation mode 620, the system may require brushless motor 152 in substantially continuous motion in order to utilize alternate sensing 170 (see FIG. 1). As an example, a process may be used to maintain continuous motion rather than use continuous dithering with brushless motor 150.

The continuous motion process begins at step 630 where motor control 140 and/or ECU 110 controls brushless motor 150 to a commanded position. The process continues at step 640.

At step 640, the system determines whether brushless motor 150 is at the commanded position or not. If brushless motor 150 is not at the commanded position, the system continues at step 630 to move brushless motor 152 the commanded position.

If the system determines that brushless motor 150 is at the commanded position, the system would need to maintain brushless motor 150 in motion. The process then continues at step 650.

At step 650, a new commanded position is provided to brushless motor 150. This may be a position that is near the commanded position, but not the actual commanded position. Thus, the motor may be moved clockwise or counterclockwise about the commanded position to maintain motion. The amount of offset (e.g., away from the commanded position) may be a predetermined number of rotations, or degrees, to maintain brushless motor 150 in motion but also not substantially change the intended steering direction. Moreover, the predetermined amount of offset may factor the speed of the vehicle into the method such that the offset does not substantially change the intended steering direction given the speed of the vehicle or the intended steering angle. The process then continues at step 630.

CONCLUSION

Computing devices such as disclosed and referred to herein may employ any of a number of computer operating systems, including, but by no means limited to, versions and/or varieties of operating systems, including embedded operating systems. Computing devices in general may include any one of a number of computing devices, including, without limitation, multiple electronic control units or processes within electronic control units.

Computing devices such as those discussed herein generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
    an alternative sensing system for a brushless motor that provides a predetermined level of steering assistance to a vehicle, the alternative sensing system being configured to provide position information of the brushless motor to a controller when at least one of a first sensor and a second sensor fails to provide brushless motor position information,
    wherein the alternative sensing system provides a second predetermined level of steering assistance to the brushless motor, wherein the second predetermined level of steering assistance provides less assistance than the first predetermined level of steering assistance.

2. The system of claim 1, wherein the brushless motor is driven at the second predetermined level of steering assistance when the alternative sensing system is utilized.

3. The system of claim 2, wherein the alternative sensing system detects back-EMF of a coil of the brushless motor to determine the position information.

4. The system of claim 3, wherein the controller maintains the brushless motor in motion when the alternative sensing system is utilized.

5. The system of claim 4, wherein the controller verifies the position information of the brushless motor using at least two of the first sensor, the second sensor, and the alternative sensing system.

6. The system of claim 4, wherein the controller utilizes the alternative sensing system when a comparison of the first sensor position information and the second sensor position information is greater than a predetermined tolerance.

7. The system of claim 4, wherein the controller utilizes the alternative sensing system when at least one of the first sensor and the second sensor is determined invalid.

8. The system of claim 4, wherein the controller removes the steering assistance when at least two of the first sensor, the second sensor, and the alternative sensing system is determined invalid.

9. A system, comprising:
    a sensing system for a brushless motor that provides a predetermined level of steering assistance to a vehicle, the sensing system being configured with a controller to drive at least three coils of the brushless motor, the sensing system selectively determining the back-EMF of at least one of the at least three coils to provide position information when a brushless motor sensor providing position information fails,
    wherein the controller reduces the predetermined level of steering assistance to a non-zero value when the brushless motor sensor fails.

10. The system of claim 9, wherein the brushless motor receives less power when driven at the reduced predetermined level of steering assistance.

11. The system of claim 10, wherein the controller utilizes the sensing system when the controller receives a sensor failure indicator.

12. The system of claim 11, wherein the sensing system detects a back-EMF of at least one of the coils of the brushless motor to determine a position of the brushless motor.

13. The system of claim 12, wherein the controller maintains the brushless motor in motion when the sensing system is utilized.

14. The system of claim 13, wherein the controller verifies the position information of the motor using sensing system and a second sensor.

15. The system of claim 14, wherein the controller removes the steering assistance when at least two of the sensor, the second sensor, and the sensing system is determined invalid.

16. A method, comprising:
    driving a brushless motor to provide steering assistance;
    receiving an indication that a first motor position sensor is invalid;
    enabling a sensing system to determine the position of the motor;
    sensing the position of the motor using the sensing system by determining the back-EMF of a coil of the motor;
    verifying the motor position with the sensing system and a second motor position sensor; and driving the motor utilizing the verified motor position at a reduced assistance level if the first motor position sensor is invalid.

17. The method of claim 16, further comprising:
maintaining the brushless motor in motion when the when the sensing system is enabled.

18. The method of claim 17, further comprising:
driving the motor at a first predetermined assistance level before receiving the indication.

19. The method of claim 18, wherein driving the motor at the reduced assistance level includes driving the motor at a second predetermined assistance level that is less than the first predetermined assistance level.

20. The method of claim 19, further comprising:
adjusting the second predetermined assistance level based on vehicle data.

* * * * *